(12) United States Patent
Bonardo et al.

(10) Patent No.: US 12,258,098 B2
(45) Date of Patent: Mar. 25, 2025

(54) CONTROL DEVICE FOR HYDRAULIC BRAKES OF A TWO-WHEELED VEHICLE

(71) Applicant: RAICAM DRIVELINE S.R.L., Mondovi' (IT)

(72) Inventors: Sandro Bonardo, Peveragno (IT); Roberto Canale, Narzole (IT)

(73) Assignee: RAICAM DRIVELINE S.R.L., Mondovì (IT)

( * ) Notice: Subject to any disclaimer, the term of this patent is extended or adjusted under 35 U.S.C. 154(b) by 412 days.

(21) Appl. No.: 17/798,878

(22) PCT Filed: Feb. 9, 2021

(86) PCT No.: PCT/IB2021/051027
§ 371 (c)(1),
(2) Date: Aug. 10, 2022

(87) PCT Pub. No.: WO2021/161160
PCT Pub. Date: Aug. 19, 2021

(65) Prior Publication Data
US 2023/0091631 A1    Mar. 23, 2023

(30) Foreign Application Priority Data
Feb. 10, 2020   (IT) .................. 102020000002530

(51) Int. Cl.
*B62L 3/02*     (2006.01)
*B60T 11/20*    (2006.01)

(52) U.S. Cl.
CPC ............. *B62L 3/023* (2013.01); *B60T 11/203* (2013.01)

(58) Field of Classification Search
CPC ........... B62L 3/023; B62L 3/08; B60T 11/203
See application file for complete search history.

(56) References Cited

U.S. PATENT DOCUMENTS

| | | | |
|---|---|---|---|
| 3,848,692 A | 11/1974 | Messner et al. | |
| 4,914,971 A * | 4/1990 | Hinkens | F16C 1/22 |
| | | | 74/489 |
| 5,845,539 A * | 12/1998 | Huang | B62L 3/02 |
| | | | 74/489 |
| 6,003,639 A * | 12/1999 | Buckley | F16D 55/228 |
| | | | 188/26 |

(Continued)

FOREIGN PATENT DOCUMENTS

| | | |
|---|---|---|
| CN | 102745293 A | 10/2012 |
| EP | 1795420 A2 | 6/2007 |

(Continued)

OTHER PUBLICATIONS

International Search Report, issued in PCT/IB2021/051027, mailed Apr. 20, 2021, Rijswijk, NL.

(Continued)

*Primary Examiner* — Thomas W Irvin
(74) *Attorney, Agent, or Firm* — Cittone Demers & Arneri LLP; Henry J. Cittone

(57) ABSTRACT

A control device having two brake master cylinders both of which may be simultaneously operated by the same single manual control lever according to a combined or integral braking mode is provided. A switching member associated with the manual control lever may exclude one of the two brake master cylinders.

12 Claims, 3 Drawing Sheets

(56) References Cited

U.S. PATENT DOCUMENTS

| | | | | |
|---|---|---|---|---|
| 6,298,744 B1* | 10/2001 | Huang | ............... | B62L 3/08 |
| | | | | 74/489 |
| 7,377,367 B2* | 5/2008 | Takizawa | ............... | B62L 3/023 |
| | | | | 188/344 |
| 7,530,435 B2* | 5/2009 | Lumpkin | ............... | B62L 3/023 |
| | | | | 188/344 |
| 7,757,488 B2* | 7/2010 | Dunlap, III | ............... | B60T 11/16 |
| | | | | 60/588 |
| 8,146,716 B2* | 4/2012 | Siew | ............... | B60T 11/22 |
| | | | | 188/344 |
| 9,096,288 B2* | 8/2015 | Nago | ............... | B62K 23/06 |
| 10,676,151 B2* | 6/2020 | Nakai | ............... | B62L 3/023 |
| 10,737,745 B2* | 8/2020 | Chang | ............... | B60T 1/06 |
| 10,829,180 B2* | 11/2020 | Sakai | ............... | B60T 11/102 |
| 2008/0155982 A1* | 7/2008 | Jones | ............... | B62L 3/023 |
| | | | | 248/309.2 |
| 2013/0174543 A1* | 7/2013 | Nago | ............... | B60T 11/206 |
| | | | | 60/562 |
| 2014/0109567 A1* | 4/2014 | Hujer | ............... | B60T 11/18 |
| | | | | 60/594 |
| 2016/0177976 A1* | 6/2016 | Ruopp | ............... | B60T 11/16 |
| | | | | 60/592 |
| 2016/0264213 A1* | 9/2016 | Swanson | ............... | B62M 25/08 |
| 2023/0020090 A1* | 1/2023 | Bonardo | ............... | B60T 11/24 |
| 2023/0234544 A1* | 7/2023 | Struve | ............... | B60T 8/3225 |
| | | | | 303/121 |

FOREIGN PATENT DOCUMENTS

| | | |
|---|---|---|
| JP | 2016037193 A | 3/2016 |
| WO | 2007004243 A1 | 1/2007 |

OTHER PUBLICATIONS

Written Opinion issued in PCT/IB2021/051027, mailed Apr. 20, 2021, Rijswijk, NL.

* cited by examiner

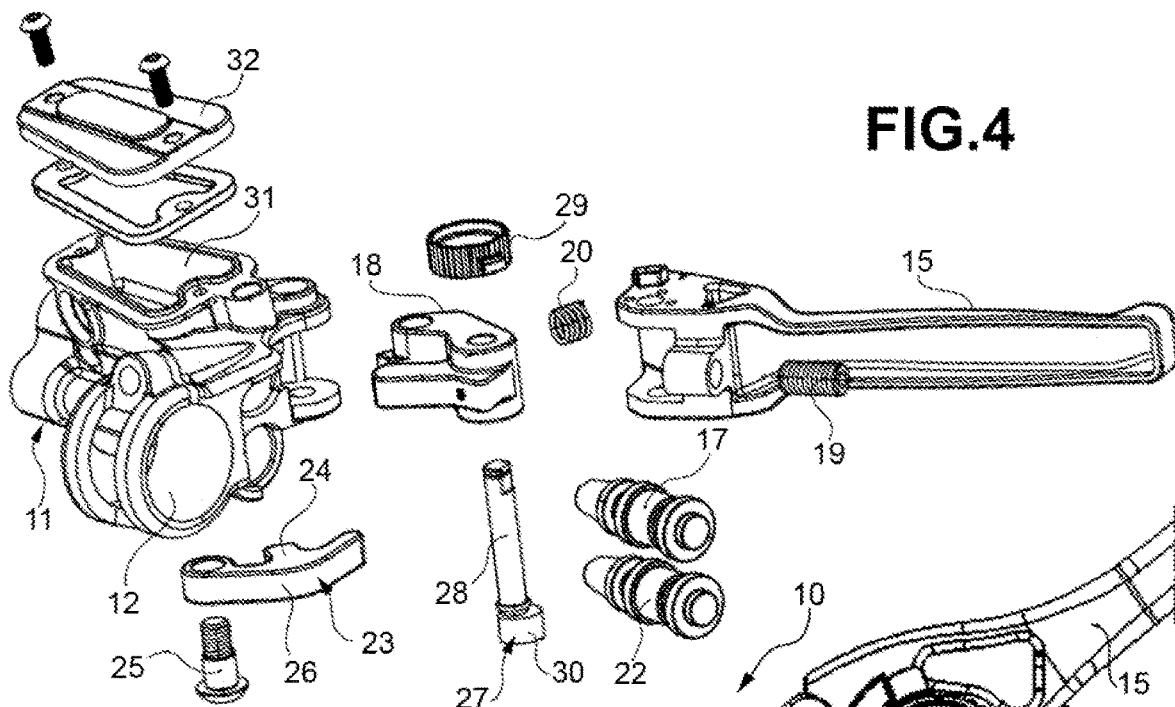
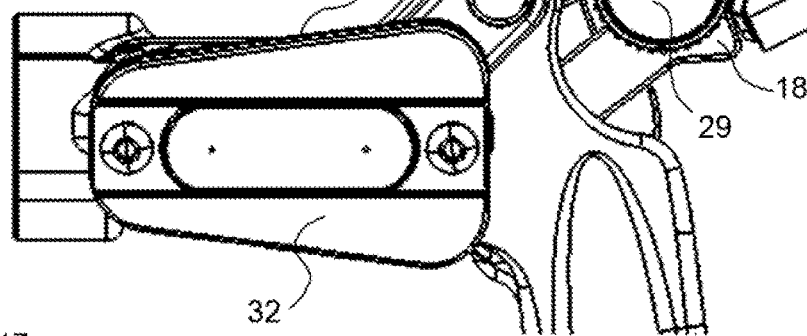
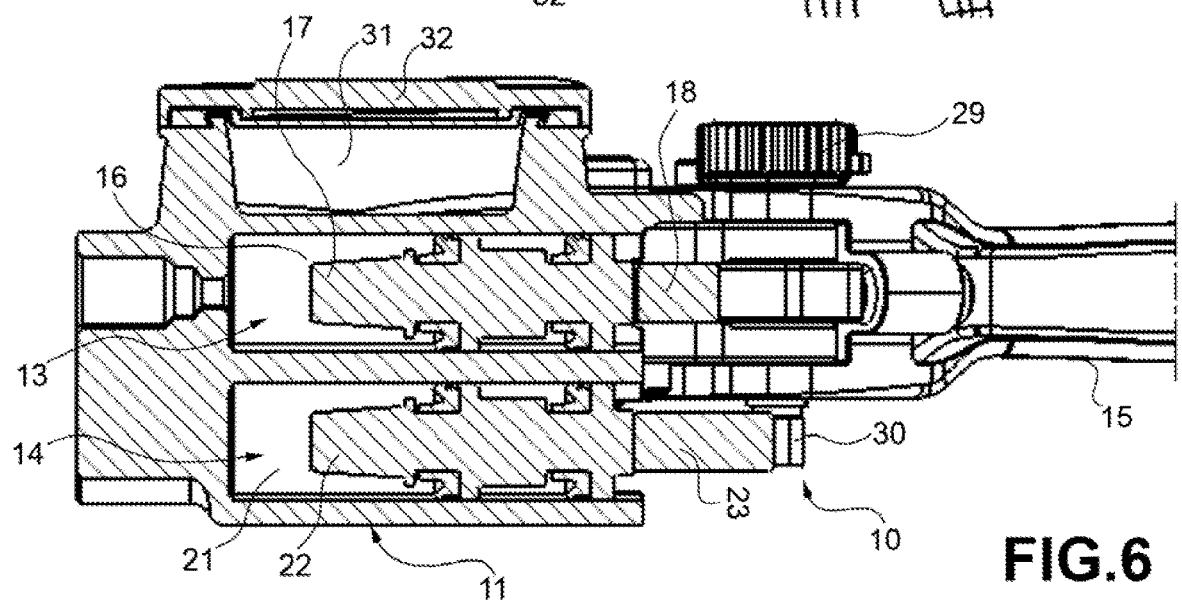

FIG.7
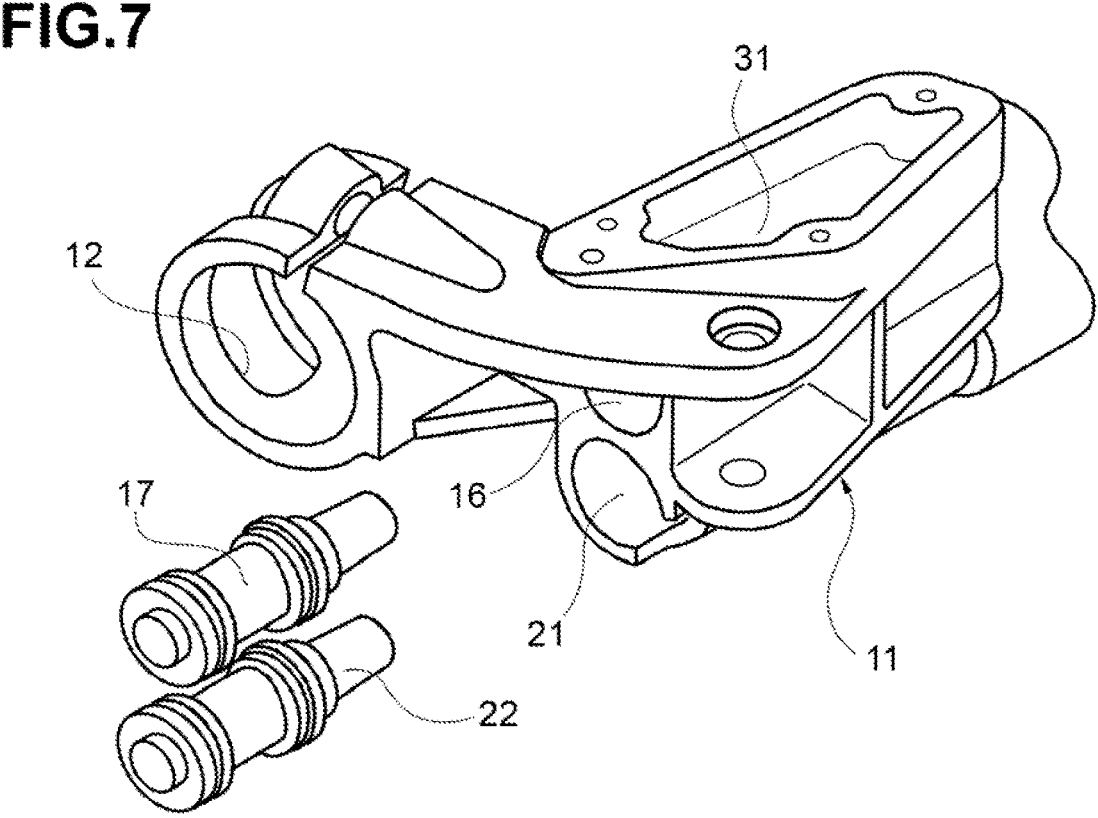
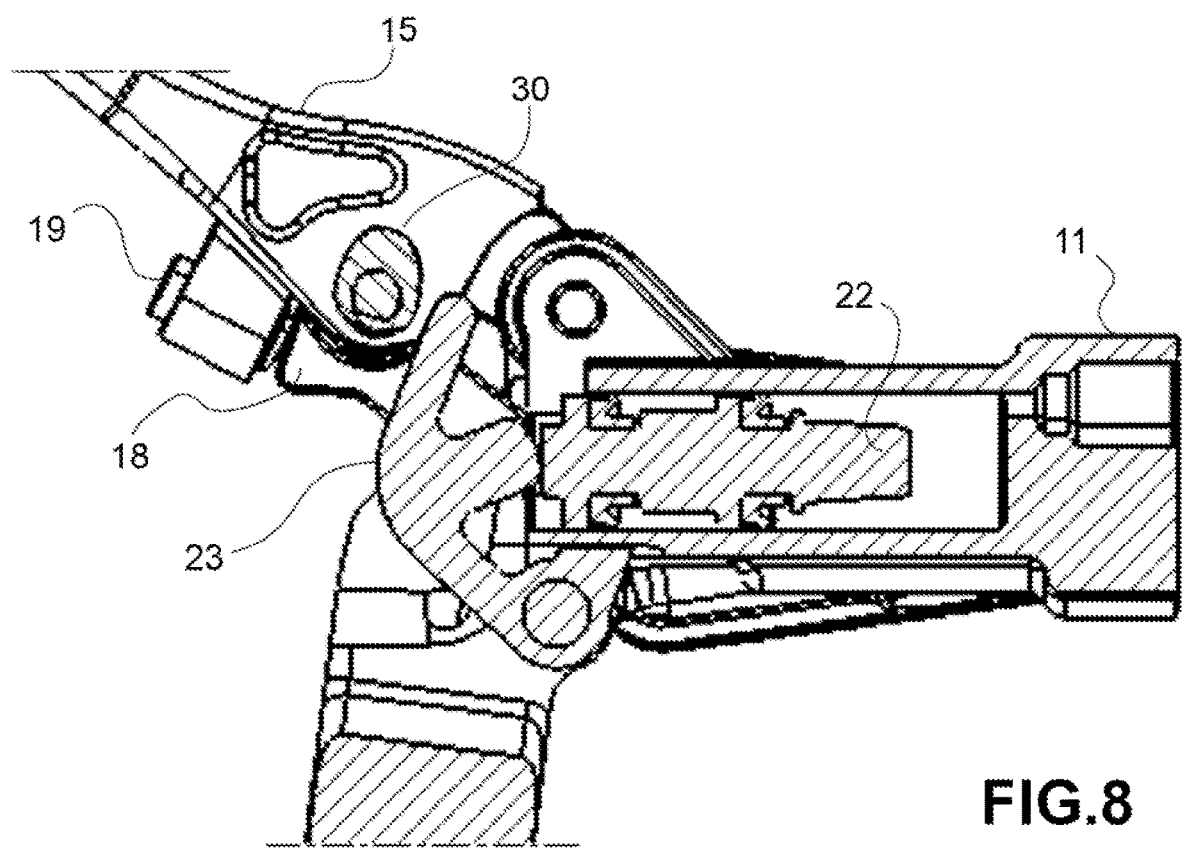
FIG.8

CONTROL DEVICE FOR HYDRAULIC BRAKES OF A TWO-WHEELED VEHICLE

CROSS-REFERENCE TO RELATED APPLICATIONS

This application is a National Phase Application of PCT International Application No. PCT/IB2021/051027, having an International Filing Date of Feb. 9, 2021, claiming priority to Italian Patent Application No. 102020000002530, filed Feb. 10, 2020 the disclosures of each of which are hereby incorporated by reference in its entireties.

TECHNICAL FIELD

The present invention relates to a device for controlling the hydraulic brakes of a two-wheeled vehicle to achieve a combined braking. In particular, but not exclusively, the control device may be applied to two-wheeled vehicles such as bicycles, motorcycles, scooters.

BACKGROUND ART

Combined (or integral) braking systems for two-wheeled vehicles are known which are capable of distributing the braking force to both the front wheel and the rear wheel simultaneously. In combined braking systems, instead of assigning the action of the front and rear brakes to two separate controls, a single control simultaneously actuates the front and rear brakes.

Patent publication CN 102745293 A discloses a combined braking system comprising a hydraulic brake distributor that has an outer body which forms a cylindrical cavity in communication with two outlets and two inlets for the brake fluid. Two separate piston valve elements are mounted axially movably in the cylindrical cavity, these piston valve elements being axially aligned and axially movable in the cavity. The valve elements are provided with sealing gaskets that act against the inner wall of the cylindrical cavity. The actuation of the first of the two brake controls causes brake fluid to flow into the cylindrical cavity from an inlet arranged in an intermediate position between two piston valve elements. The actuation of the first brake control causes both of the piston valve elements to move, with a consequent simultaneous flow of brake fluid toward both the front and rear brakes. The actuation of the second brake control causes brake fluid to flow toward only one of the brakes, either the front or rear.

A brake control device for a two-wheeled vehicle is known having a double brake master cylinder which may be controlled by means of two control levers placed side by side on the handlebar. An upper lever operates the front brake while the lower lever operates the rear brake. The two levers are close together and may be operated at different times or together with one hand. The device features a separate double hydraulic chamber with two separate fluid reservoirs for a double actuation.

SUMMARY OF THE INVENTION

It is an object of the present invention to provide a control device for the hydraulic brakes of a two-wheeled vehicle capable of selectively carrying out either a combined braking, simultaneously on both the front and rear wheels of a two-wheeled vehicle, or alternatively a braking action on the brake of only one of the two wheels.

The aforesaid and other objects and advantages, which will be better understood in the following detailed description, are achieved, according to one aspect of the present invention, by a brake control device as described and claimed herein. Preferred embodiments of the brake control device are also described. Briefly summarized, the control device comprises two brake master cylinders, both of which may be operated simultaneously by the same single manual control lever, according to a combined or integral braking mode. A switching element, associated with the manual control lever, may exclude one of the two master cylinders.

BRIEF DESCRIPTION OF THE DRAWINGS

Some preferred but non-limiting embodiments of a brake control device according to the invention will now be described, with reference to the accompanying drawings, wherein:

FIG. 4 is an exploded view of the control device of FIG. 1-3;

FIG. 5 is a top view of the brake control device of FIG. 1;

FIG. 6 is a vertical sectional view of the brake control device;

FIG. 7 is another exploded perspective view of some of the components of the brake control device; and FIG. 8 illustrates the control device in a condition in which a switching element is in the inactive position.

DETAILED DESCRIPTION

Figure 1:
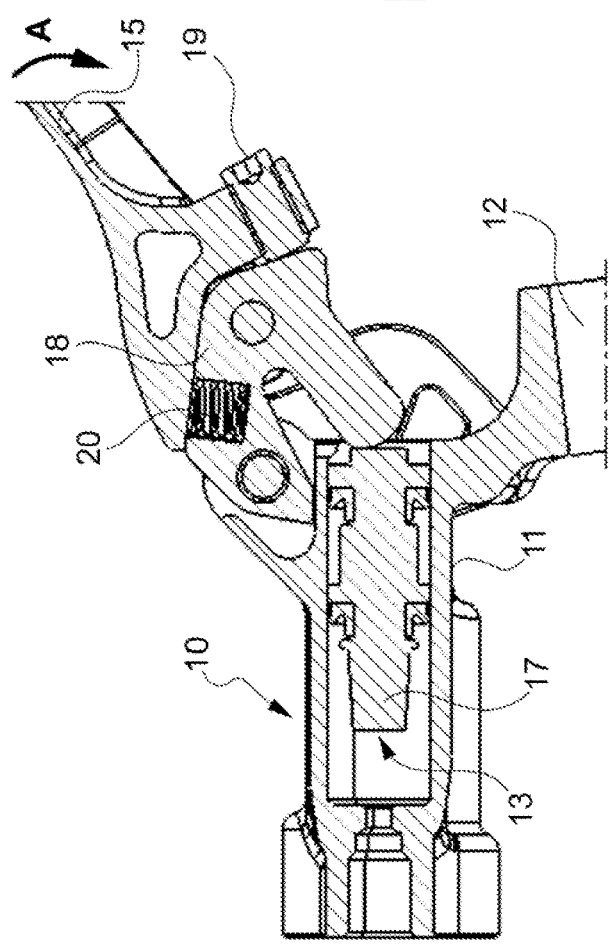
FIG. 1 is a sectional view from above of a brake control device.

With reference to the figures, numeral 10 indicates in its entirety a control device for the hydraulic brakes of a two-wheeled vehicle (not shown), equipped with a first rear brake for a rear wheel and a second front brake for a front wheel.

The control device 10 comprises a master cylinder body 11 which may be attached to a handlebar (not shown) of the two-wheeled vehicle. For attaching to the handlebar, the master cylinder body 11 may have a cylindrical seat 12. The control device 10 comprises a first 13 and a second 14 brake master cylinder, both of which may be operated by the same single manual control lever 15.

The master cylinder body 11 may be made of plastics or metal material.

The control lever 15 is hinged to the master cylinder body 11 about a hinging axis which, in conditions of use, is oriented substantially vertically or slightly inclined.

To optimize the overall dimensions, the first brake master cylinder 13 is preferably located adjacent to the second brake master cylinder 14. According to a preferred embodiment, the first brake master cylinder is located immediately above the second brake master cylinder.

The first brake master cylinder 13 comprises a first hydraulic chamber 16 formed in the master cylinder body 11 and hydraulically connectable to the rear brake, and a first piston 17, movable in the first hydraulic chamber 16.

Advantageously, the master cylinder body 11 also forms a top reservoir 31 to supply brake fluid (for example oil) to the first hydraulic chamber 16 and thus to the first brake, the rear one in this example. The second hydraulic chamber 21 may be fed by the hydraulic circuit (not shown) of the second brake, the front one in this example. A lid for closing the reservoir 31 is indicated with 32.

According to an embodiment, the control lever 15 may act in a thrust relationship on the first piston 17 by means of a first intermediate transmission or thrust member 18, rotatably mounted on the master cylinder body 11 about a rotation axis coincident or parallel to the hinging axis of the lever 15 to the master cylinder body 11.

Preferably, the first intermediate transmission member 18 is adjustable with respect to the control lever 15, for example by means of an adjustment screw 19. The adjustment screw 19 allows the rest position of the control lever 15 to be adjusted, placing it nearer or further away from the handlebar according to the size of the user's hand.

According to an embodiment, an elastic element 20, for example a compression spring, interposed and acting in thrust relationship between the first intermediate thrust member 18 and the control lever 15, may be provided to urge the first intermediate member 18 constantly against the adjustment screw and to take up the play between the member 18 and the lever 15, preventing the transmission of vibrations. The intermediate thrust element 18 may be made of a first material, for example forged aluminum, while the control lever 15 may be made of a second lighter material, for example an aluminum alloy.

The lever 15, when rotated in the direction indicated by the arrow A (FIG. 1), acts on the first piston 17 of the first brake master cylinder 13 to operate the rear brake. Optionally, by operating a switching member 27, the driver may actuate simultaneously the front brake as well as the rear brake with the same actuating movement of the control lever 15.

The second brake master cylinder 14 comprises a second hydraulic chamber 21, formed in the master cylinder body 11 and hydraulically connectable to the front brake, and a second piston 22, movable in the second hydraulic chamber 21.

According to a preferential and particularly compact embodiment, the two hydraulic chambers are adjacent, parallel and arranged one immediately above the other.

According to an embodiment, the control lever 15 may act in thrust relationship on the second piston 22 by means of a second intermediate thrust or transmission member 23, rotatably mounted to the master cylinder body 11 about a rotation axis 25 coincident or parallel to the hinging axis of the lever 15 to the master cylinder body 11.

According to a preferential embodiment, the second intermediate transmission member is obtained as a lever, in particular a second-class lever, having a thrust portion 24, acting against the second piston 22 and an engagement surface 26 on which the switching member 27 may optionally act.

The switching member 27 may be rotatably mounted to the manual control lever 15. The switching member 27 may advantageously be obtained as a cam switching member. In the illustrated preferred embodiment, the switching member 27 includes a pin 28, which may be rotationally actuated by means of a wheel 29 accessible to the driver, and a surface 30 which is eccentric with respect to the pin 28. By acting on the wheel 29, the driver may vary the angular position of the eccentric surface 30 between a passive position and an active position.

Figure 2:
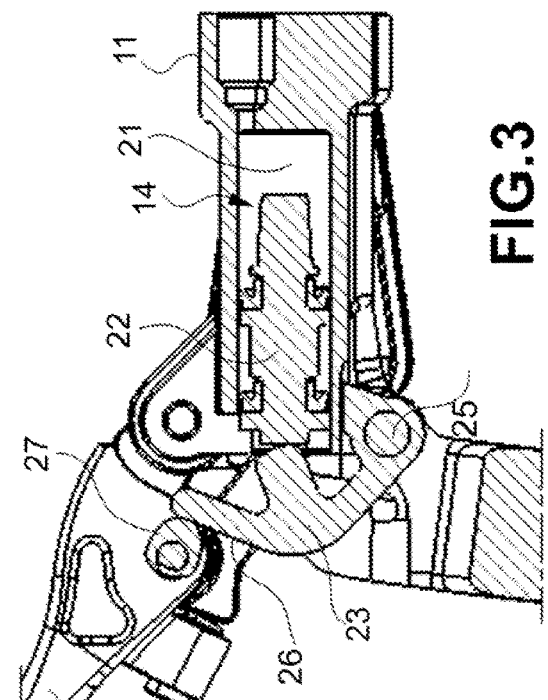
FIG. 2 is a sectional view from below, according to a lower section plane than that of FIG. 1, showing the brake control device in a first non-activated position.
Figure 3:
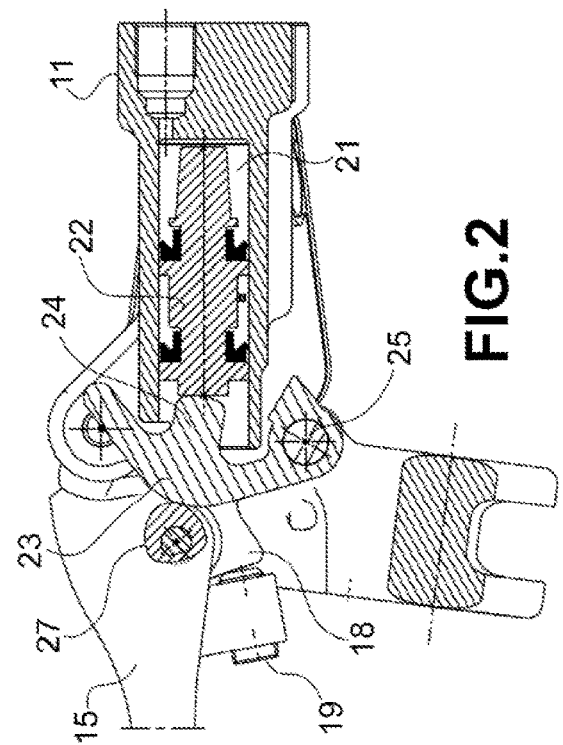
FIG. 3 is a sectional view similar to FIG. 2, illustrating the brake control device in a second activated position.

When the driver wishes to operate the front and rear brakes simultaneously by means of the manual control lever 15, the wheel 29 must be rotated so that the eccentric surface 30 moves to the position illustrated in FIG. 2, where the eccentric surface 30 is in contact with the second intermediate transmission member 23. By rotating the manual control lever 15, the eccentric surface 30 stresses the second intermediate transmission member 23 which thrusts the second piston 22 (FIG. 3), actuating the front brake. The actuation of the manual control lever 15, in this first operating mode, produces the simultaneous activation of the front and rear brakes of the two-wheeled vehicle, according to a combined or integral braking mode.

Alternatively, when the driver wishes to exclude the front brake from the influence of the manual control lever 15, the wheel 29 must be turned so that the eccentric surface 30 moves to an inactive position (FIG. 8), where the eccentric surface 30 is spaced apart and does not interfere with the second transmission member 23 when the manual control lever 15 is operated.

Various aspects and embodiments of the brake control device have been described; it is understood that each embodiment may be combined with any other embodiment. Furthermore, the embodiments and the constructional details may be widely varied with respect to that which has been described and illustrated purely by way of non-limiting example, without thereby departing from the scope of the invention, as defined in the appended claims.

The invention claimed is:

1. A control device for hydraulic brakes of a two-wheeled vehicle provided with a first brake for a first wheel and a second brake for a second wheel, the control device comprising:
a first brake master cylinder comprising:
a master cylinder body,
a first hydraulic chamber formed in the master cylinder body and hydraulically connectable to the first brake, and
a first piston, movable in the first hydraulic chamber;
a manual control lever, rotatable with respect to the master cylinder body, acting on the first piston to operate the first brake;
wherein the control device further comprises:
a second brake master cylinder, comprising:
a second hydraulic chamber formed in the master cylinder body and hydraulically connectable to the second brake, and
a second piston, movable in the second hydraulic chamber for operating the second brake by said manual control lever,
a switching member, associated with the manual control lever, to selectively activate and deactivate the second piston, the switching member having two alternative positions:
a first passive position, in which a rotation of the manual control lever does not activate the second piston, and
a second active position, in which a rotation of the manual control lever simultaneously actuates the first piston to actuate the first brake and the second piston to actuate the second brake, according to a combined or integral braking mode.

2. The control device of claim 1, wherein the switching member is a cam device comprising an eccentric surface.

3. The control device of claim 2, wherein the switching member comprises a pin rotatable by a wheel accessible to a driver, and said eccentric surface, which is eccentric with respect to the pin.

4. The control device of claim 1, wherein the switching member is rotatably mounted on the manual control lever.

5. The control device of claim 1, wherein the manual control lever is pivotally mounted to the master cylinder body.

6. The control device of claim 1, wherein the first and second hydraulic chambers are adjacent, parallel and arranged one above the other.

7. The control device of claim 1, wherein the manual control lever acts in thrust relationship on the second piston by a second intermediate thrust or transmission member rotatably mounted to the master cylinder body about a rotation axis coincident or parallel to a hinging axis of the manual control lever to the master cylinder body.

8. The control device of claim 7, wherein the second intermediate thrust or transmission member is made as a lever, having a thrust portion acting against the second piston and an engagement surface on which the switching member may optionally operate.

9. The control device of claim 1, wherein the master cylinder body forms a top reservoir to supply brake fluid to the first hydraulic chamber.

10. The control device of claim 1, wherein the manual control lever acts in a thrust relationship on the first piston by a first intermediate thrust or transmission member rotatably mounted to the master cylinder body about a rotation axis coincident or parallel to a hinging axis about which the manual control lever is pivotally mounted to the master cylinder body.

11. The control device of claim 10, wherein the first intermediate thrust or transmission member is adjustable with respect to the manual control lever by an adjustment element which allows a rest position of the manual control lever to be adjusted, placing it closer to or farther from a vehicle handlebar.

12. The control device claim 11, wherein an elastic element is interposed and acting in a thrust relationship between the first intermediate thrust or transmission member and the manual control lever, for urging the first intermediate thrust or transmission member constantly towards the adjustment element to take up play between the first intermediate thrust or transmission member and the manual control lever.

* * * * *